Patented Apr. 24, 1951

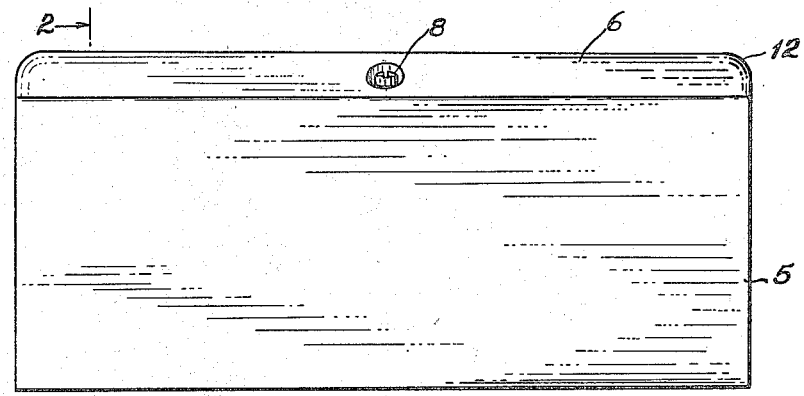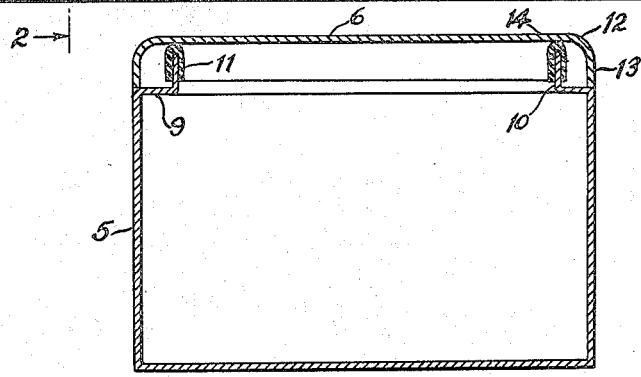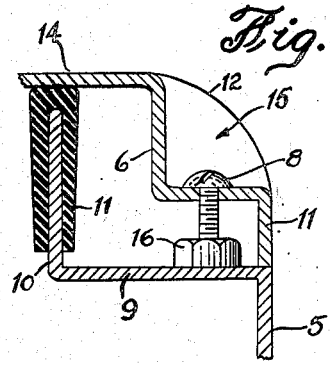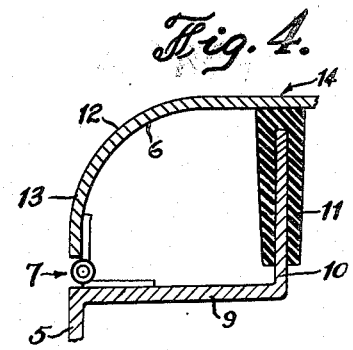

2,550,493

UNITED STATES PATENT OFFICE 2,550,493

DUSTPROOF BOX

Reynold Algot Ohlson, Plainville, Conn., assignor to The Trumbull Electric Manufacturing Company, Plainville, Conn., a corporation of Connecticut Application December 27, 1945, Serial No. 637,405

6 Claims. (Cl. 220—46)

My invention relates particularly to boxes with covers having round edges and corners.

One object is to provide such a box with a hinged cover and a fastening device.

A special object is to substantially conceal the hinges and the fastening device or at least embody them within the curved edges of the box.

Another object is to provide a dustproof box in which the sealing means is enclosed and concealed within the cover so as to protect the sealing means and also produce a neat and attractive appearance to the box.

Another object is to provide a dustproof box of metal having a maximum stiffness or strength for a minimum thickness of metal.

Another object is to provide a construction in which an adequate seal is provided without requiring close fitting or accurately dimensioned parts.

Fig. 1 is a side view of one form of box embodying the improvements of my invention.

Fig. 2 is a cross-sectional view of the same.

Fig. 3 is an enlarged fragmentary sectional view showing a fastening device.

Fig. 4 is an enlarged fragmentary sectional view showing a hinged portion.

The box 5 and the cover 6, either or both, may be made of sheet metal and provided with fastening devices such as a hinge 7 at one edge and a latch or catch 8 at the other edge.

The body is formed with an inturned ledge or step-in portion 9 around all of its edges with an upstanding flange 10. Upon this flange is mounted a resilient gasket 11.

The edges 12 of the cover are rounded over and terminate in flanges 13 adapted to seat on the ledges 9 of the body when the cover is closed and the gasket compressed suitably by pressure from the flat portion 14 of the cover. This prevents the application of any uncalculated pressure upon the gasket.

The fastening device for the cover may be of the character of Letters Patent No. 2,263,208 or in the form of a simple screw 8 housed in a recess 15 in the edge of the cover. In this case, the ledge 9 may be provided with a screw seat 16 suitably secured to the ledge.

It will thus be seen that the gasket is completely concealed and protected and provides a dustproof joint independent of the particular form of fastening devices employed which do not themselves require any special gasket.

The inturned ledges and the upstanding flanges greatly stiffen and reinforce the body as well as the cover.

The round flanges or edges of the cover furnish a smooth top to the box without any projections and also stiffen the cover.

The downturned edges of the cover, the inturned ledges and the upturned flanges and gaskets form an air space around the top of the box. Such a construction can be readily made commercially and economically inasmuch as the dimensions of the box and cover need not be made to accurately match as is necessary in boxes which have closely fitting covers.

I claim:

1. A rectangular sealed box having a body with intergral inwardly projecting ledges terminating in upwardly projecting flanges and a cover formed of sheet metal with arched edges seated on said ledges and resilient gaskets mounted on the edges of said flanges, said cover pressing against said gaskets, said edges of the cover, said ledges, said flanges and said gaskets enclosing an air space.

2. A sealed box having a body with inwardly projecting ledges terminating in upwardly projecting flanges and a cover formed of sheet metal with arched edges adapted to be seated on said ledges and resilient gaskets mounted on the edges of said flanges, said cover pressing against said gaskets, said cover having a hinge at the base of the arch at one edge secured to the adjacent ledge.

3. A rectangular sealed box having a body with inwardly projecting ledges terminating in upwardly projecting sheet metal flanges and a cover formed of sheet metal with edges seated on said ledges and resilient gaskets mounted on the edges of said flanges, said cover pressing against said gaskets, said cover having a fastening device set into one of the edges and secured to the adjacent ledge, said edge of the cover, said ledges, said flanges and said gaskets enclosing an air space.

4. A rectangular sealed box having a body with inwardly projecting ledges terminating in upwardly projecting flanges and a cover having rounded corners and arched edges seated on said ledges and resilient gaskets mounted on the edges of said flanges, said cover pressing against said gaskets, said cover having a fastening device set into one of the arched edges and secured to the adjacent ledge.

5. A rectangular sealed box having a body with inwardly projecting ledges terminating in upwardly projecting flanges and a cover having rounded corners and arched edges seated on said ledges and resilient gaskets mounted on the edges of said flanges, said cover pressing against said gaskets, said cover having a hinge at the base of the arch at one edge secured to the adjacent ledge and said cover having a fastening device set into one of the arched edges and secured to the adjacent ledge.

6. A receptacle formed of sheet metal having a rectangular body with inwardly projecting portions forming peripheral ledges, flanges projecting at abrupt angles from said peripheral ledges, resilient gaskets supported solely by the edges of said flanges, a sheet metal cover having a peripheral flange spaced outwardly from said gaskets to register with said peripheral ledges and means for securing said cover to said body and causing said cover to compress the edges of said gaskets and drawing the flanges of the cover against the peripheral ledges of the body.

REYNOLD ALGOT OHLSON.

REFERENCES CITED

The following references are of record in the file of this patent:

UNITED STATES PATENTS

| Number | Name | Date |
|---|---|---|
| 1,428,430 | Gerojohn | Sept. 5, 1922 |
| 1,436,617 | Warren et al. | Nov. 21, 1922 |
| 1,599,652 | Cranston | Sept. 14, 1926 |
| 1,986,057 | Hackworth | Jan. 1, 1935 |
| 2,083,503 | Nelson | June 8, 1937 |
| 2,291,719 | Huehnel | Aug. 4, 1942 |

FOREIGN PATENTS

| Number | Country | Date |
|---|---|---|
| 667,958 | Germany | Nov. 23, 1938 |